March 10, 1925.
W. OEHLSTROM
WATER HEATING APPARATUS
Filed March 22, 1924   2 Sheets-Sheet 1
1,528,945
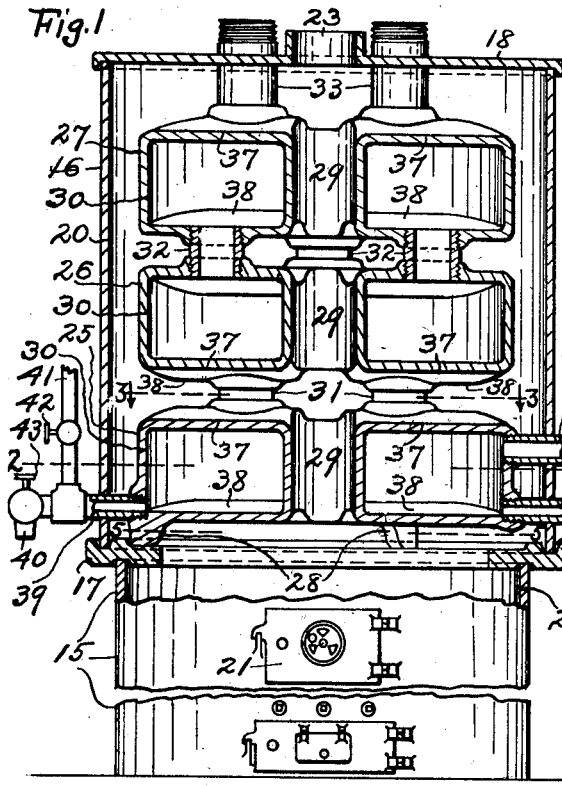
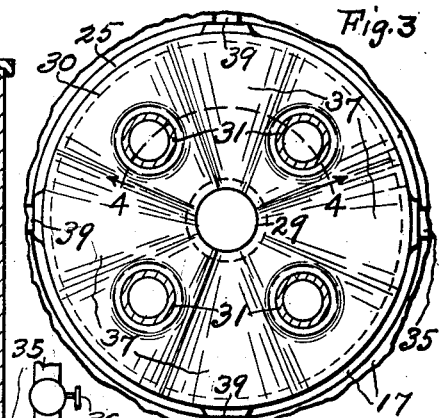
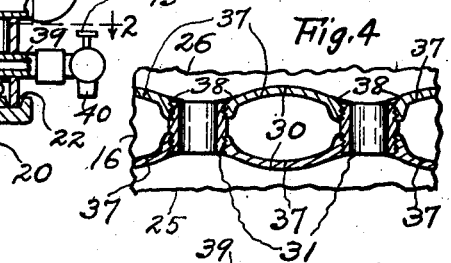
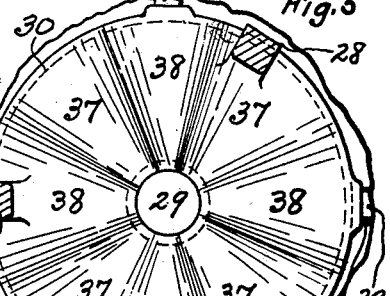
Inventor:
William Oehlstrom
By his Attorney.

March 10, 1925.  W. OEHLSTROM  1,528,945
WATER HEATING APPARATUS
Filed March 22, 1924   2 Sheets-Sheet 2
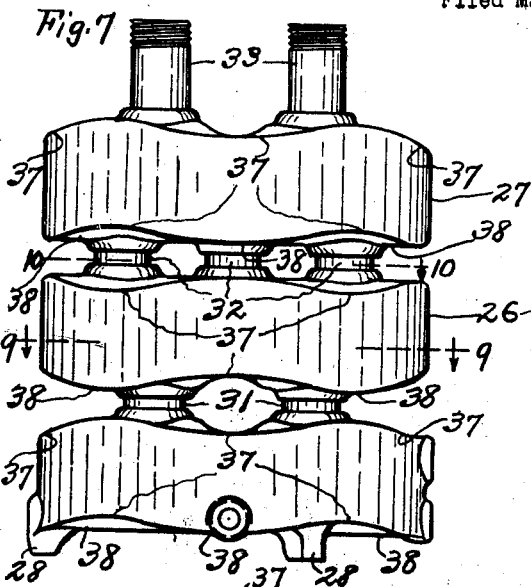
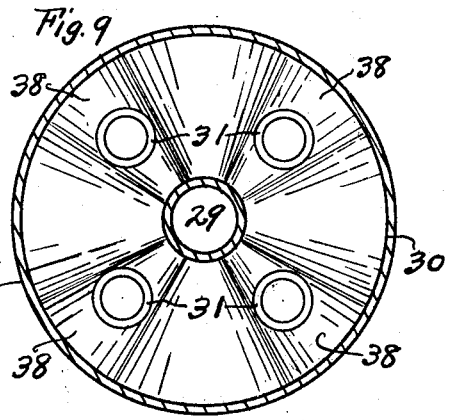
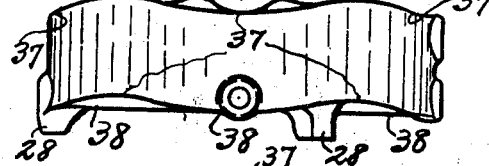
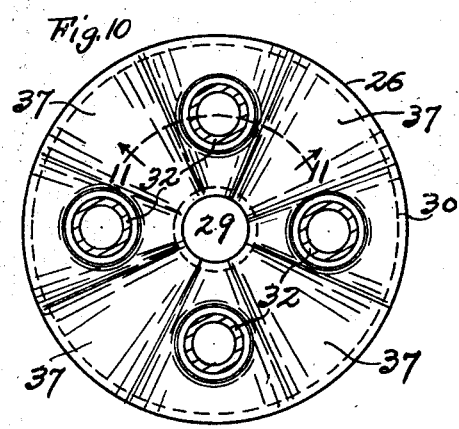
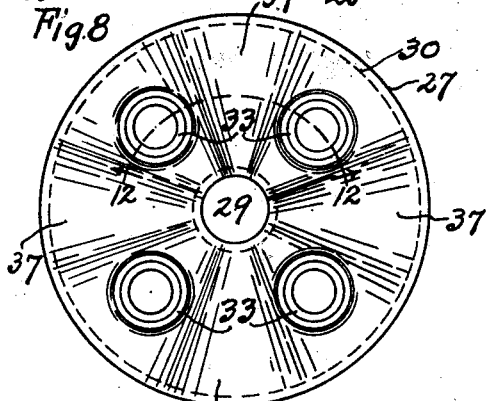
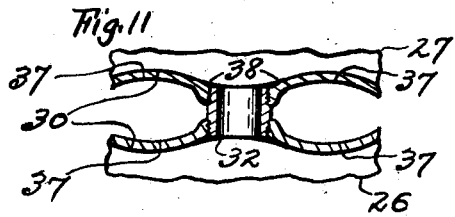
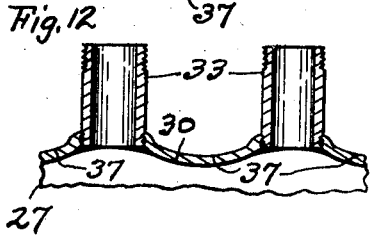
Inventor:
William Oehlstrom
By his Attorney.

Patented Mar. 10, 1925.

1,528,945

UNITED STATES PATENT OFFICE.

WILLIAM OEHLSTROM, OF PARMA TOWNSHIP, CUYAHOGA COUNTY, OHIO.

WATER-HEATING APPARATUS.

Application filed March 22, 1924. Serial No. 701,237.

*To all whom it may concern:*

Be it known that I, WILLIAM OEHLSTROM, a citizen of the United States, residing in the township of Parma, in the county of Cuyahoga and State of Ohio, have invented a new and useful Water-Heating Apparatus, of which the following is a specification.

This invention relates to improvements in water-heating apparatus, and pertains more especially to a water-heating apparatus comprising a combustion-chamber having an outlet for products of combustion, vertically spaced water-heating drums contained within said combustion-chamber, appurtenances for feeding water to the interior chamber of the lowermost drum and for draining said drum, means for conducting water from the interior chamber of the uppermost drum, and means for establishing communication between adjacent drums.

One object of this invention is to so contour and relatively arrange the water-heating drums as to cause them to materially participate in a desirable distribution and circulation of products of combustion within the combustion-chamber and to insure an economical utilization of said products of combustion.

Another object is to employ water-heating drums having tops and bottoms which are so contoured as to effect the formation, on and exteriorly of said drums, of extensive surfaces arranged to be advantageously exposed to products of combustion in the combustion-chamber and to facilitate the transmission of heat from said products of combustion to the water that may be contained in said drums.

Another object is to contour the bottoms of the interior chambers of the water-heating drums as required to effect the formation of troughs participating in the formation of said chambers, and a further object is to facilitate drainage of all of said drums when required.

My improved water-heating apparatus comprises a sectional casing which has a top provided with a substantially central outlet for products of combustion and forms the walls of the combustion-chamber, and a further object is to form, not only sinuous passageways for products of combustion in said chamber but also a substantially straight central passage for conducting products of combustion, substantially vertically, to the aforesaid outlet from the bottom of the lowermost drum.

Another object is to insure a satisfactory drainage of water into the lower from the upper of adjacent drums by placing the interior chamber of the lower of said drums in open relation with the interior chamber of the upper of said drums by pipes communicating at the bottom of and with the troughs of said upper of said drums.

Another object is to so relatively arrange adjacent water-heating drums that the troughs of the bottom of the lower of said drums shall be in staggered relation to the pipes employed in establishing communication between said drums so as to facilitate the supply of heated water to said pipes from the interior chamber of the lower of said drums.

Another object is to render my improved water-heating apparatus simple and durable in construction as well as highly efficient and economical, and to so relatively arrange the component parts of said apparatus that said parts can be assembled with facility and are readily renewable.

With these objects in view, and to attain other objects hereinafter appearing, this invention consists in certain features of construction, and combinations and relative arrangements of parts, hereinafter described in this specification, pointed out in the claim, and illustrated in the accompanying drawings.

In said drawings, Figure 1 is a side elevation, largely in central section, of a water-heating apparatus embodying my invention, and portions are broken away in said figure to reduce the size of the drawing. Figs. 2 and 3 are horizontal sections taken along the line 2—2 and line 3—3 respectively, in Fig. 1, looking downwardly. Fig. 4 is a section, in detail, taken along the curved line 4—4 in Fig. 3, looking outwardly. Fig. 5 is a horizontal section taken along the line 5—5 in Fig. 1, looking upwardly. Fig. 6 is a vertical section, in detail, taken along the curved line 6—6 in Fig. 2, looking outwardly. Fig. 7 is a side view of the connected together drums of my improved water-heating apparatus. Fig. 8 is a top plan of the uppermost water-heating drum. Fig. 9 is a section taken horizontally through the intermediate water-heating drum along the line 9—9 in Fig. 7, looking downwardly.

Fig. 10 is a horizontal section taken along the line 10—10 in Fig. 7, looking downwardly. Fig. 11 is a vertical section taken along the curved line 11—11 in Fig. 10. Fig. 12 is a vertical section taken through the top of the uppermost drum along the curved line 12—12, in Fig. 8.

My improved water-heating apparatus (see Figs. 1 and 2) comprises a casing preferably consisting of a lower section 15, an upper section 16, a ring 17 interposed between the sections 15 and 16, and a top 18 for the upper section 16. The lower section 15 preferably consists of a vertical tubular cast-iron shell forming the surrounding wall of the lower and fuel-receiving portion of a combustion-chamber 20 and has a door 21 affording access to said portion of said chamber. The ring 17 is preferably composed of cast iron and mounted on the top edge of and concentric in relation to the section 15 and measures less in internal diameter and more in external diameter than said section 15. The outer portion of the ring 17 is provided, at its top, with an annular recess 22 which is concentric in relation to the section 15, and the bottom of said recess forms a seat for the upper casing-section 16 which may consist of a substantially vertical cast-iron shell substantially circular in cross-section. The top 18 preferably consists of a cast-iron plate disposed to form a closure for and resting on the upper end of the section or shell 16 which participates in the formation of the surrounding wall of the combustion-chamber 20, and said top is preferably provided centrally with an upwardly projecting flue 23 which forms the outlet of said chamber for products of combustion, and the passage of products of combustion from said flue to a chimney or stack (not shown) may be effected and controlled in any approved manner.

The combustion-chamber 20 (see Fig 1) is shown containing a series of three vertically spaced water-heating drums, and 25, 26 and 27 indicate the lowermost drum, the intermediate drum and the uppermost drum respectively. Said drums are in line vertically and spaced from the surrounding wall of and surrounded by the combustion-chamber 20 and arranged above the ring 17, and the lowermost drum 25 is shown provided, at the outer circumference of its bottom, with feet 28 which are spaced circumferentially of said drum and rest on the ring 17. Each drum has a substantially central opening 29 participating in the formation of a substantially vertical flue disposed to conduct products of combustion upwardly through said drum, and also has an interior annular water-receiving chamber 30 extending circumferentially of and preferably surrounding said flue. The opening or flue 29 of each drum is in communication, at its lower and upper extremities, with the combustion-chamber 20 which extends between adjacent drums and over the uppermost drum. The openings or flues 29 of the drums 25, 26 and 27 and the outlet 23 of the combustion-chamber 20 are preferably substantially in line vertically so as to form a substantially straight central passage for conducting products of combustion substantially vertically to said outlet from the bottom of the lowermost drum 25.

Substantially vertical pipes 31 (see Figs. 1, 3, 4, 7 and 9) are spaced preferably equidistantly circumferentially of the space between the openings or flues 29 of the lowermost drum 25 and the intermediate drum 26 and establish communication between the interior chambers 30 of said drums, and said pipes extend between and are preferably threaded into and therefore secured to said drums and support the upper from the lower of said drums.

Substantially vertical pipes 32 (see Figs. 1, 7, 10 and 11) are spaced preferably equidistantly circumferentially of the space between the openings or flues 29 of the intermediate drum 26 and the uppermost drum 27 and establish communication between the interior chambers 30 of said drums, and said pipes extend between and are preferably threaded into and therefore secured to said drums and support the upper from the lower of said drums.

Obviously the pipes connecting together adjacent drums constitute means for draining water from the interior chamber of the upper of said drums into the interior chamber of the lower of said drums and also constitute means for conducting water upwardly from the interior chamber of the lower of said drums into the interior chamber of the upper of said drums.

The uppermost drums 27 (see Figs. 1, 7, 8 and 12) is provided, at the top thereof, with substantially vertical pipes 33 spaced substantially equidistantly circumferentially of the space between the opening or flue 29 of said drum and the outlet 23 of the combustion-chamber 20, and said pipes 33 communicate with the interior chamber 30 of said drum and extend upwardly from said drum and through and above the top 18 of the casing and constitute means for conducting water upwardly from said drum and are adapted to be placed in communication with different pipes (not shown) of a pipe-system employed in conducting or feeding hot water to different portions of a building which is to be heated and comprising a return pipe 35.

Cold water is supplied to the interior chamber 30 of the lowermost drum 25 as will hereinafter appear, and the return-pipe 35 is placed in communication with said chamber and attached in any approved manner to said drum and has a valve 36 externally of the casing.

To the end of minimizing the waste of products of combustion and economizing in the consumption of fuel the bottom and top of each drum are so contoured as to form several substantially horizontal external recesses 37 which extend substantially radially of said drum from the outer circumference of the drum to the opening 29 of the drum, and said recesses, as shown in Figs. 3, 5, 8 and 10, are widest at said circumference of said drum to facilitate the passing of products of combustion into said recesses from said circumference of said drum and gradually reduced in width toward said opening, and obviously products of combustion can pass endwise of and through said recesses. The external recesses 37 at the top of each drum are preferably in staggered relation to the external recesses 37 at the bottom of said drum. It will be observed, therefore, that the water-heating drums 25, 26 and 27 of my improved water-heating apparatus have bottoms and tops which are so contoured as to effect the formation, on and exteriorly of said drums, of extensive surfaces adapted to be exposed to products of combustion in the combustion-chamber 20 containing said drums, and as to facilitate the transmission of heat from said products of combustion to the water contained in said drums during the operation of the apparatus. The relative arrangement of adjacent water-heating drums is preferably such that the external recesses 37 in the bottom of the upper of adjacent drums (see Figs. 4, 7 and 11) are substantially directly opposite different external recesses 37 respectively in the top of the lower of said drums so as to facilitate the passage of products of combustion between said drums and be helpful in insuring an economical utilization of said products of combustion.

The bottom of the interior chamber 30 of each water-heating drum is contoured, between adjacent external recesses 37 of said bottom, as required to effect the formation, between the outer circumference and the opening or flue 29 of said drum, of a substantially horizontal trough 38 which participates in the formation of said chamber and extends substantially radially of said drum and is widest at its outer end, as shown in Figs. 2, 3, 5 and 9, and gradually reduced in width toward its inner end, and obviously adjacent side walls of adjacent troughs of the bottom of each drum participate in the formation of opposite side walls respectively of the external recess 37 between said adjacent troughs.

In order to facilitate the passage of water between the interior chambers of adjacent drums the pipes establishing communication between said drums alternate with the adjacent external recesses 37 in each of said drums, as shown in Figs. 3, 4, 10 and 11, and the sides of each trough 38 diverge upwardly as shown in Figs. 4, 6 and 11. As the external recesses 37 of the bottom of each drum alternate with the troughs 38 of said bottom and are in staggered relation to the external recesses in the top of said drum, obviously said troughs are in staggered relation to the pipes leading upwardly from said drum, and the relative arrangement of the parts is preferably such that, as shown in Figs. 4 and 11, each pipe extending between adjacent drums communicates, at its lower extremity and between adjacent external recesses 37 in the top of the lower of said drums, with the interior chamber of said lower of said drums and communicates, at its upper extremity, at the bottom of and with a trough of the upper of said drums. It will also be observed that each pipe 33 attached to the uppermost drum extends upwardly from said drum between adjacent external recesses 37 in the top of said drum, and that each pipe extending upwardly from the upper of adjacent drums is out of line vertically with the pipes establishing communication between said drums so as to avoid any substantially vertical passage of water through the series of drums 25, 26 and 27 of my improved water-heating apparatus.

By the hereinbefore described construction and relative arrangement of the parts it will be observed that said series of drums are supported from the casing, that during the operation of my improved water-heating apparatus products of combustion pass between the feet 28 to the outer circumference of the lowermost drum of said series of drums and into the opening or flue 29 of said lowermost drum and all of the drums and the pipes 31, 32 and 33 are surrounded by products of combustion, and that the products of combustion are so distributed between adjacent drums as to result in an efficient and economical heating of said drums. It will also be observed that the number of troughs 38 of the bottom of the upper of adjacent drums corresponds with the number of pipes extending between said drums, and that the placing of the interior chamber of said upper of said drums by said pipes in communication, at the bottom of said troughs, with the interior chamber of the lower of said drums facilitates a satisfactory drainage of the upper of said drums when required.

The seat formed by the ring 17 for the lowermost water-heating drum is above the lower casing-section 15, and into said drum, at the outer end of each trough 38 of the bottom of said drum (see Fig. 1), is threaded a pipe 39 which is in communication with said trough at the bottom and outer end of the trough and extends over and transversely of the ring 17 and external of the casing. At the outer end of each pipe 39 is a drain-cock 40 for draining purposes, and a cold-water-feeding pipe 41 is placed in communication with one pipe 39 externally of the casing at a point between the casing and the drain-cock connected to said pipe. The pipe 41 has a valve 42 in proximity to the connected pipe 39. Obviously the valves 43 of the drain-cocks 40 are closed preparatory to the opening of the valve 42 of the cold-water-feeding pipe for supplying water to the water-heating drums and any system (not shown) of pipes and radiators to be placed in communication with the pipes 33 and return-pipe 35, and of course the valve of the cold-water-feeding pipe is closed, if not already closed, preparatory to the opening of the valves of the drain-cocks.

The casing may be constructed in any approved manner and provided, if desired, with a door or doors (not shown) for convenient access to the water-heating drums for cleaning purposes, and I would here remark that the construction of casings for forming the walls of combustion-chambers is too well known in the art to require illustration and description, in detail, in this specification. Also, the joints between component parts of the apparatus are rendered fluid-tight and furthermore formed in such a manner as to withstand heat and strains to which said parts may be subjected, but means for forming such joints are too well known to require description and illustration in this specification.

What I claim is:—

Water-heating apparatus comprising vertically spaced drums each of which has a substantially central opening participating in the formation of a flue disposed to conduct products of combustion upwardly through the respective drum and also has an interior chamber extending circumferentially of said flue and having a bottom which is contoured as required to form troughs participating in the formation of said chamber, a casing which supports said drums and participates in the formation of a combustion-chamber communicating with said flue and containing and extending circumferentially of said drums and having an outlet for products of combustion, means for conducting water from the interior chamber of the uppermost drum, means for placing the lower of adjacent drums in communication at the bottoms of and with the troughs of the upper of said drums, and appurtenances for draining the troughs of and for supplying water to the lowermost drum, the troughs of the bottom of the upper of adjacent drums and the troughs of the bottom of the lower of said drums being out of line vertically, the bottom of each drum having external recesses alternating with the troughs of said bottom, and the top of the lower of adjacent drums having external recesses opposite the external recesses in the bottom of the upper of said drums.

In testimony whereof, I sign the foregoing specification.

WILLIAM OEHLSTROM.